(12) United States Patent
Wotherspoon

(10) Patent No.: US 9,485,250 B2
(45) Date of Patent: Nov. 1, 2016

(54) AUTHORITY TRUSTED SECURE SYSTEM COMPONENT

(71) Applicant: NCR Corporation, Duluth, GA (US)

(72) Inventor: Brian Steven Wotherspoon, Fife (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/610,845

(22) Filed: Jan. 30, 2015

(65) Prior Publication Data

US 2016/0226863 A1 Aug. 4, 2016

(51) Int. Cl.
| | | |
|---|---|---|
| *G06F 21/00* | (2013.01) | |
| *H04L 29/06* | (2006.01) | |
| *G06Q 20/18* | (2012.01) | |
| *G06Q 20/38* | (2012.01) | |
| *G07F 7/10* | (2006.01) | |
| *G07F 9/00* | (2006.01) | |

(52) U.S. Cl.
CPC ........... *H04L 63/0853* (2013.01); *G06Q 20/18* (2013.01); *G06Q 20/3829* (2013.01); *G07F 7/1016* (2013.01); *G07F 9/006* (2013.01); *H04L 63/061* (2013.01); *H04L 63/083* (2013.01); *H04L 63/0876* (2013.01)

(58) Field of Classification Search
CPC . H04L 63/08; H04L 63/0853; H04L 63/061; H04L 63/083; H04L 63/0876; H04L 63/0428; G06F 21/606; G06Q 20/18; G06Q 20/3829; G07F 7/1016; G07F 9/006
USPC ......................................................... 713/170
See application file for complete search history.

(56) References Cited

U.S. PATENT DOCUMENTS

| 6,065,679 A | 5/2000 | Levie et al. |
|---|---|---|
| 9,117,328 B2 | 8/2015 | Crews et al. |

(Continued)

FOREIGN PATENT DOCUMENTS

| EP | 2704078 A1 | 3/2014 |
|---|---|---|
| EP | 1408459 A1 | 4/2014 |
| WO | 02/39398 | 5/2002 |

OTHER PUBLICATIONS

European Search Report issued in co-pending European Patent Application 15194705.8 dated Jun. 3, 2016.

*Primary Examiner* — Yogesh Paliwal
(74) *Attorney, Agent, or Firm* — Schwegman, Lundberg & Woessner; Paul W. Martin

(57) ABSTRACT

One embodiment is in the form of a Self-Service Terminal (SST), such as an automated teller machine (ATM). The SST includes a peripheral device, such as a cash dispenser, and a security controller device including a memory device and a coupling to the peripheral device. The security controller device is operable to perform data processing activities including receiving peripheral device identifying data from the peripheral device and transmitting a public key ($SC_{pk}$) of the security controller device to the peripheral device. The security controller may then decrypt a received peripheral device encryption key (Ki) according to $SC_{pk}$, generate a first security controller encryption key ($Ke_1$), and generate a first message authentication code key and encrypt the first message authentication code key according to $Ke_1$ to obtain $(Km_1)Ke_1$. $(Km_1)Ke_1$ may then be stored in the memory device and transmitted to the peripheral device.

23 Claims, 5 Drawing Sheets

(56) References Cited

U.S. PATENT DOCUMENTS

| | | | |
|---|---|---|---|
| 2001/0051922 A1* | 12/2001 | Waller | G06Q 20/102 705/43 |
| 2006/0013402 A1* | 1/2006 | Sutton, II. | H04L 9/0844 380/282 |
| 2006/0020788 A1* | 1/2006 | Han | G07F 9/026 713/165 |
| 2009/0138708 A1* | 5/2009 | Miyazaki | H04L 63/12 713/168 |
| 2013/0179688 A1* | 7/2013 | Lee | H04L 9/0822 713/168 |

* cited by examiner

AUTHORITY TRUSTED SECURE SYSTEM COMPONENT

BACKGROUND INFORMATION

Self-Service Terminals (SSTs), such as Automated Teller Machines (ATMs), generally include a personal computer (PC) at their core that control the SST operations. Such operations include communication with backend systems, receiving data and physical item input, and outputting data and physical items such as currency, receipts, and the like during the course of an SST transaction. Input to and output from an SST is typically received and output via SST peripheral devices, such as cash dispensers, Personal Identification Number (PIN) Pads, and the like.

Internal SST communications between the PC and the peripheral devices has very little authentication and security. This can result in the SST being vulnerable to malware, which, from a device perspective, impersonates the SST PC application or platform. The malware may force the peripheral devices to perform sensitive actions that have not been authorized, such as dispensing cash, vouchers, postage stamps, and the like.

SUMMARY

Various embodiments herein each include at least one of systems, devices, methods, software, and data structures for authority trusted secure system components.

One embodiment, in the form of a method performed by a peripheral device of a secure terminal, includes transmitting a peripheral device encryption key (Ki) and peripheral device identifying data encrypted with a key ($SC_{pk}$) of a security controller of a Self Service Terminal (SST) to the security controller. The method further includes receiving, from the security controller, a first encrypted message authentication code ($Km_1$) encrypted according to a first security controller encryption key ($Ke_1$). The method then stores each of Ki and the received first encrypted message authentication code ($Km_1$) encrypted according to a first security controller encryption key ($Ke_1$) in a memory.

One embodiment is in the form of a Self-Service Terminal (SST), such as an automated teller machine (ATM). The SST includes a peripheral device, such as a cash dispenser, and a security controller device including a memory device and a coupling to the peripheral device. The security controller device is operable to perform data processing activities including receiving peripheral device identifying data from the peripheral device and transmitting a public key ($SC_{pk}$) of the security controller device to the peripheral device. The security controller may then decrypt a received peripheral device encryption key (Ki) according to $SC_{pk}$, generate a first security controller encryption key ($Ke_1$), and generate a first message authentication code and encrypt the first message authentication code according to $Ke_1$ to obtain ($Km_1$) $Ke_1$. ($Km_1$)$Ke_1$ may then be stored in the memory device and transmitted to the peripheral device.

DETAILED DESCRIPTION

Internal SST communications between the PC-core and peripheral devices, such as Universal Serial Bus (USB) devices, has very little authentication or security. This results in the SST being vulnerable to malware which, from a device perspective, impersonates the application or platform. The malware can then be used to force the SST peripheral devices to perform sensitive actions that have not been authorized (e.g. cash dispense, voucher or stamp printing, etc.).

For example, assume that the PC-core is not a trusted device within the SST and therefore host authority should be cascaded down to each peripheral device in such a way that the individual peripheral device can be confident that commands it receives are genuine and authorized. Given that SST operators, such as banks when the SST is an ATM, are reluctant to make host changes, and multi-vendor applications make it difficult to change application interfaces, the various embodiment herein provide solutions that provide trust in a manner that is transparent to both the host and the PC-core application that controls operation of the SST.

For example, in some embodiments each device registers with a local authority cryptographic device, which may be referred to as a security controller, and performs an initial key exchange. The security controller in some embodiments may be embedded or included within an encrypting pin pad (EPP) device or coupled thereto or embedded in or coupled to a mother board of the core-PC of the SST. In such embodiments, the security controller keeps a database of all registered devices along with the current key for that device. It then creates trust stamps in the form of a Message Authentication Code (MAC) for each sensitive command for that device and rolls forward the key used for each MAC. In some embodiments, the MAC keys are stored only in an encrypted form, or within the protected environment of the local authority.

Figure 1:
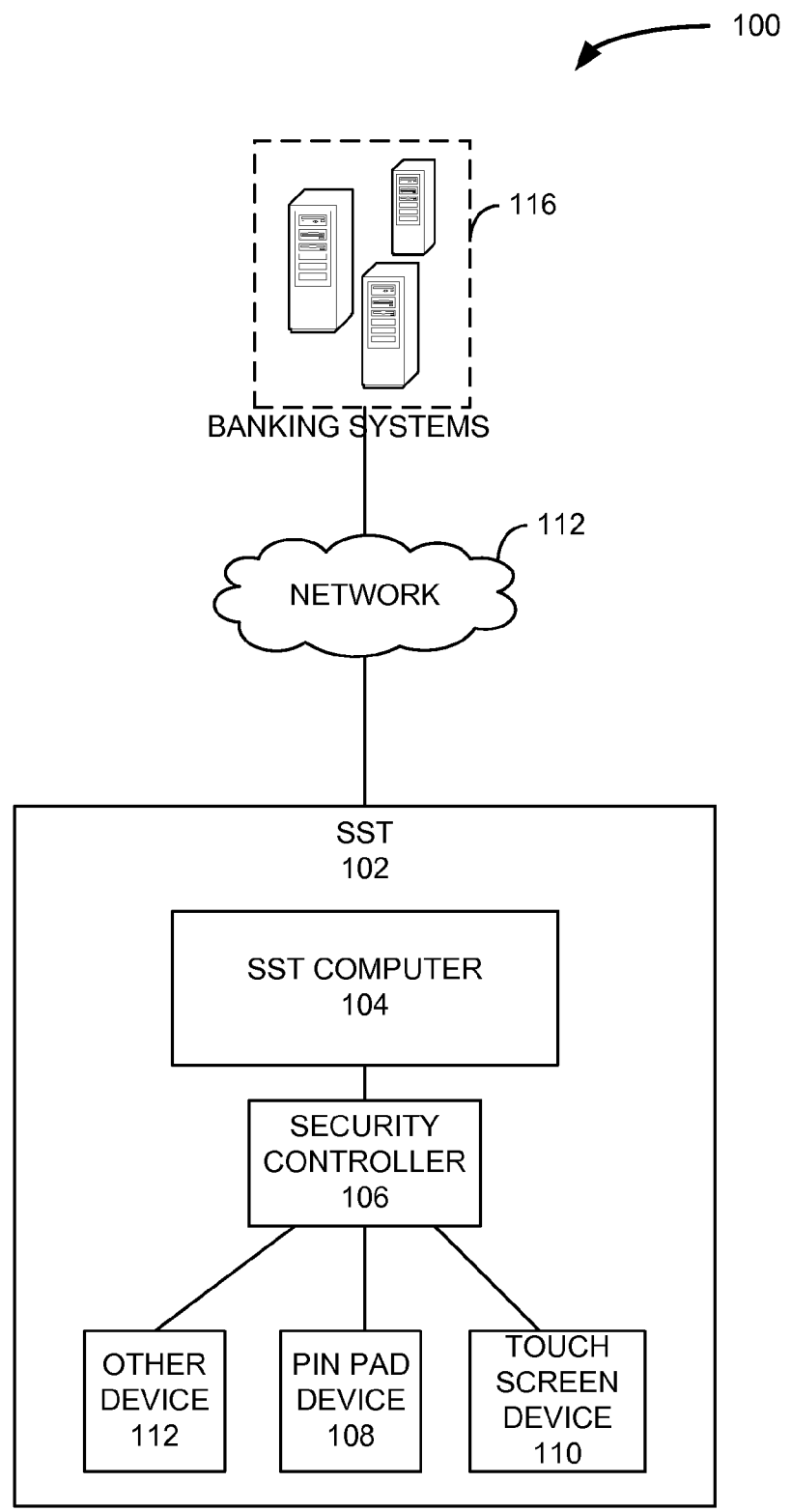
FIG. 1 is a logical block diagram of a system architecture and system components, according to an example embodiment.
Figure 2:
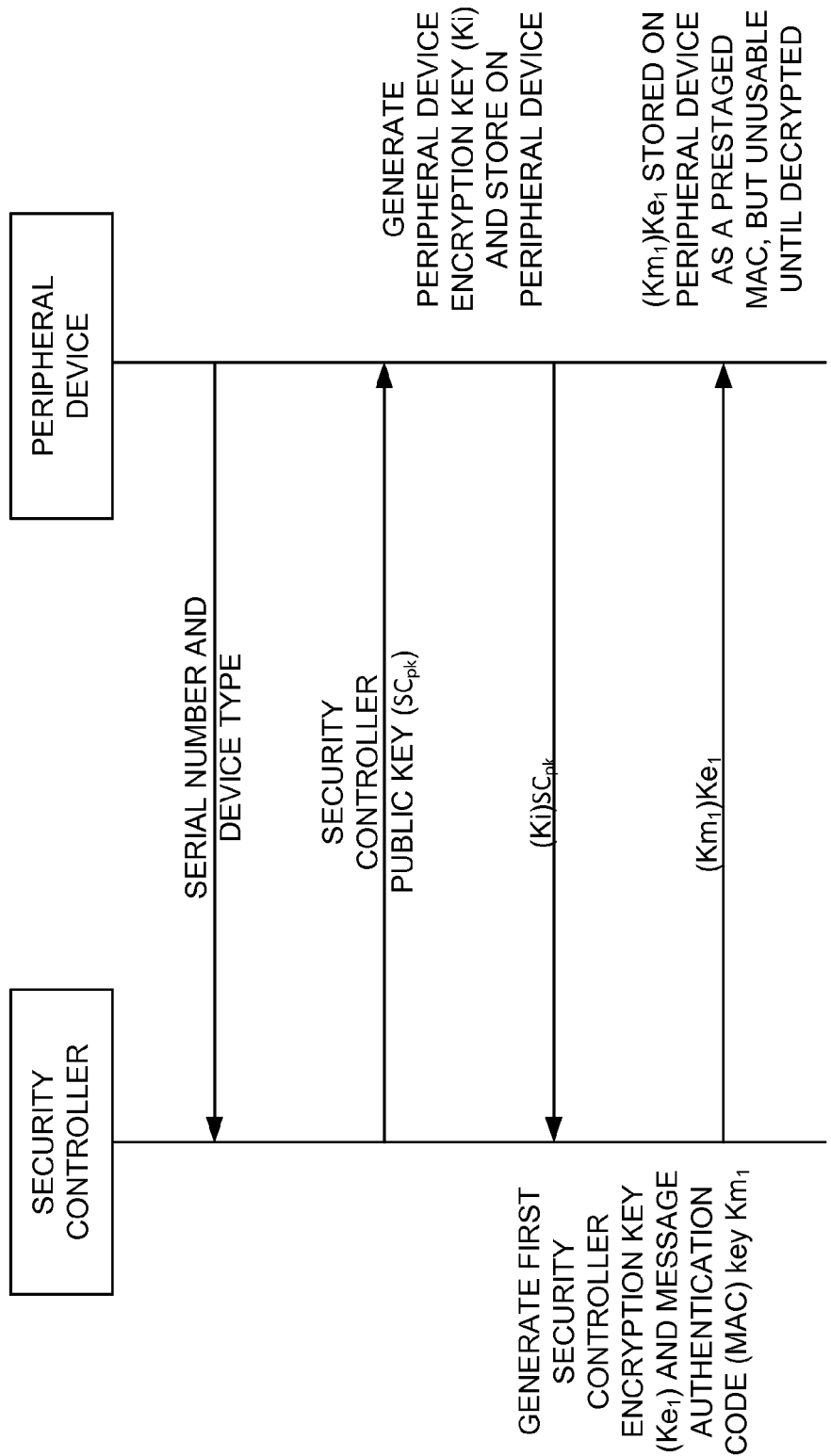
FIG. 2 is a data flow and processing chart, according to an example embodiment.
Figure 3:
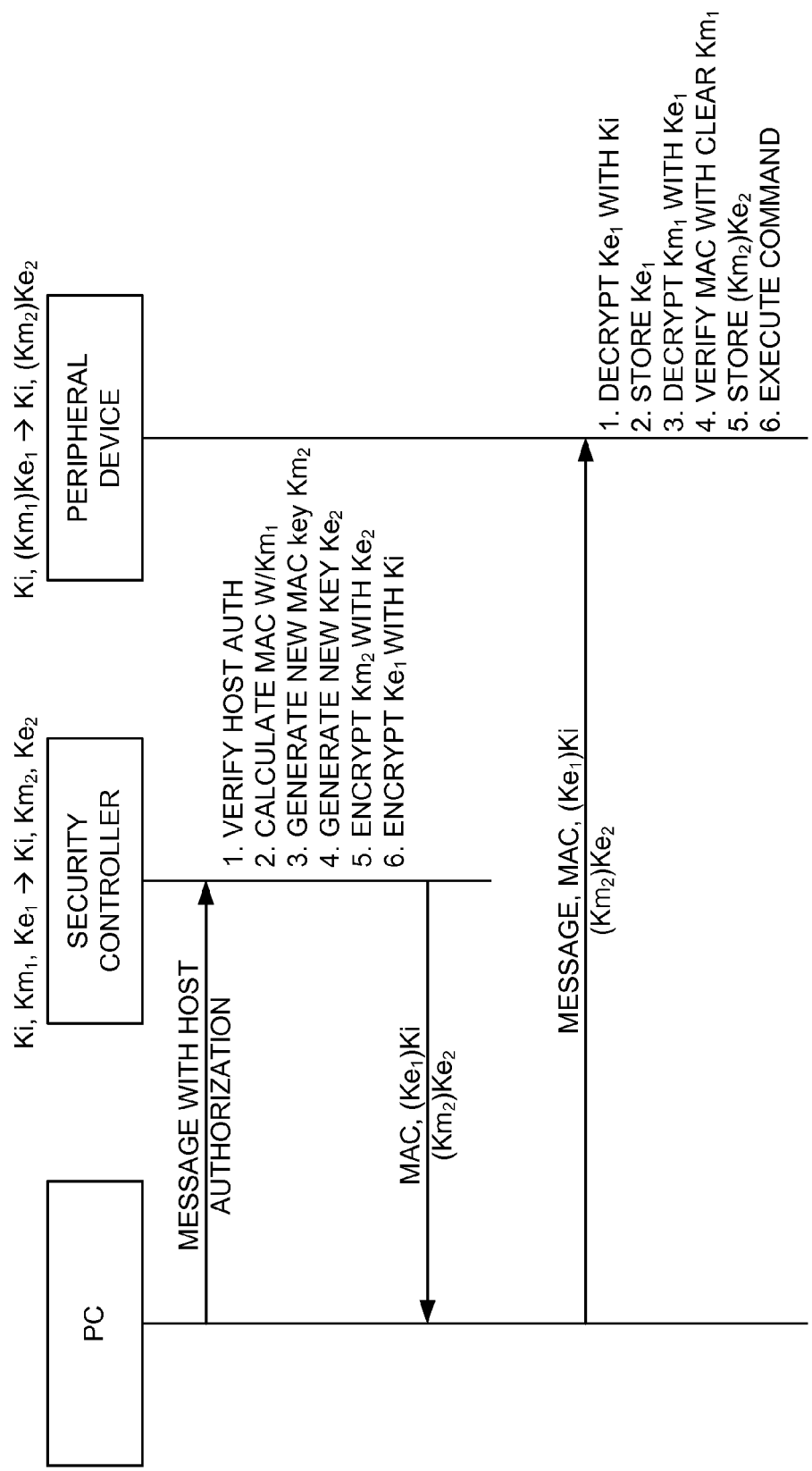
FIG. 3 is a data flow and processing chart, according to an example embodiment.

The illustration of FIG. 1 provides a system and architectural overview of some embodiments. FIGS. 2 and 3 provides logical details for establishing, utilizing, and maintaining the proper encryption keys and MACs for the various peripheral devices of some embodiments.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture and system components, according to an example embodiment. The system 100 includes an SST 102 and a banking system 116. In various embodiments, the SST 102 may be an ATM, a self-checkout point of sale terminal, a pay-at-the-pump terminal coupled to a fuel pump, a vending machine point-of-sale terminal, and other such SSTs. In operation, the security controller 106 and various peripheral devices included with or coupled to the SST 102 operate to establish and maintain synchronized encryption keys to secure and authenticate communications between security controller 106 and at least one of the various peripheral devices. FIG. 1 is provided to illustrated and describe the hardware environment and system 100 architecture. FIG. 2 and FIG. 3 provide further details as to the synchronizing, utilization, and maintenance of encryption keys.

The SST 102 is connected via a network 112 to the banking system 116. The network 112 connecting the SST 102 to the banking system 116 is a network capable of carrying data between the SST 102 and the banking system 116. Depending on the type of SST 102 of the particular embodiment, the data network may be in accord with one or more of statutory, regulatory, industry standard, network operator, and other policies and requirements.

The SST 102, in the example embodiment of the system 100, includes an SST computer 104, a security controller 106 coupled to the SST computer 104, and one or more peripheral devices connected to the security controller 106, such as PIN pad device 108, touch screen device 110, and one or more other devices 112. The other device 112 may be a cash dispenser, a receipt printer, a keyboard, an audio output device, an audio input device, a card reader, and other input and output devices.

The peripheral devices include at least one of an input or output mechanism. The peripheral devices may each include an encryption key store, such as a memory device, and a processor, ASIC, or other circuit to perform one or both of encryption and decryption operations. The encryption and decryption actions are performed on data received as input or data received to be output or to command the respective peripheral device to perform an action, such as dispense currency, output a sound, or other action. Data received by a peripheral device as input is encrypted with an encryption key established between the respective peripheral device and the security controller 106 and is transmitted to the security controller 106. Data received by a peripheral device for output is received in an encrypted form from the security controller 106 and is decrypted according to an encryption key stored in the memory and processed by the peripheral device for output or to trigger performance of an output action or other data processing action.

In some embodiments, the security controller 106 may take the form of an integrated circuit board, an enclosed device, or other form factor. However, in some embodiments the security controller 106 may instead be integrated within a motherboard of the SST computer 104, within a housing of a peripheral device such as a touch screen or PIN pad, or integrated with an integrated circuit board of such a peripheral device.

In some embodiments, the security controller 106 includes an SST connector, such as a Universal Serial Bus (USB) connector, a set of connector pins that plug into a dedicated or universal peripheral device slot on a motherboard of the SST computer 104, serial connector, or other connector to enable the security controller 106 to communicate data with the SST computer 104.

The security controller 106 may also include a processor and a memory. The processor may be a general-purpose data processing unit, one or more integrated circuits dedicated to specific tasks such as encryption, an ASIC, or other device capable of performing data processing tasks including at least one of encryption and decryption tasks depending on the particular embodiment. The memory may be a volatile or non-volatile memory. For example, the memory may be random access memory, flash memory, write-once memory, or of another memory type. The memory may also be more than one memory device where each memory device may be of the same type of memory or varied memory types.

The memory of the security controller 106 stores instructions executable by the processor to perform encryption and decryption functions utilizing encryption keys also stored in the memory. The encryption keys may be stored in one memory device of the memory and the instructions stored in a different memory device of the memory. In some such embodiments, the encryption keys may be stored in a memory designated or manufactured as a secure encryption key store, such as a Trusted Platform Module (TPM), an encrypted memory device, a volatile memory device, and the like. In some embodiments where encryption keys are stored in a volatile memory, the memory or the security controller 106 includes a battery (not illustrated) that provides power to the memory to preserve, for at least a limited duration, the stored encryption keys when an SST within which the security controller is cycled, reset, or other otherwise loses power.

The memory of the security controller 106, in some embodiments, also stores instructions to receive and process device management messages received via I/O ports from peripheral devices connected thereto. Device management messages may include data representative of one or more of peripheral device faults, errors, incidence of tampering, status, and other such information. The data of these messages may be intended for reporting to the banking system 116. Device management messages may be received in clear or cypher text. When received in cypher text, the messages are first decrypted utilizing an appropriate encryption key identified in the memory based on the peripheral device from which the device management message was received.

In some embodiments, the memory of the security controller 106 may also store instructions to generate device management instructions with regard to a status, detected events such as device tampering, loss of communication with a peripheral device, and other conditions with regard to the security controller 106. As such, the instructions stored in the memory in such embodiments include further instructions for detecting events to trigger generation of device management messages.

Regardless of whether device management messages are generated on or received by the security controller 106, device management messages are processed according to the instructions stored in the memory to pass the data of the device management message to a platform service of the SST computer 104 of FIG. 1. The platform service handles further processing and communication of the device management message to the banking system 116.

In a further embodiment, the security controller 106 includes instructions stored in the memory that are executable by the processor to handle a security controller 106 tampering event. The instructions may be triggered by detecting a data condition within the security controller 106 or upon receipt of input from one or more tamper detection devices present in the security controller 106. The instructions, when triggered, may cause all, or certain, encryption keys stored in the memory of the security controller 106 to be erased. The instructions may further attempt to generate and transmit a device management message including data indicating the detected tampering event.

The security controller 106 may also include one or more Input/Output (I/O) ports. In some embodiments, the security controller 106 includes two I/O ports. In further embodiments, the security controller 106 includes three or more I/O ports. The I/O ports may be USB ports, serial ports, proprietary device and data interconnection ports, and other port-types. In some embodiments that include more than one I/O port, the I/O ports may be of varied types, e.g., USB and serial ports. In other embodiments including a plurality of I/O ports, the I/O ports may be of all the same type.

FIG. 2 is a data flow and processing chart, according to an example embodiment. The data flow and processing chart of FIG. 2 illustrates data communications and data processing activities that are performed by and between a security controller and a peripheral device of an SST. These data communications and data processing activities are generally performed between the security controller and each or select peripheral devices included within or otherwise coupled to the SST that may perform sensitive actions, such as dispensing cash. The data communications and data processing may be performed upon initialization of the SST, at a time when a peripheral device is first coupled to the SST and recognized by the PC-core of the SST or the security controller, or at another time depending on the particular embodiment or as specified by an SST technician or administrator.

In some embodiments, the peripheral device may first send data to the security controller to register itself. For example, the peripheral device may send its serial number and an identifier of its device type, such as a cash dispenser, receipt printer, PIN pad device, and the like. The security controller, in response to the initial communication from the peripheral device, may then send its public key $SC_{pk}$ to the peripheral device. The peripheral device may then generate its own encryption key Ki and store that the encryption key Ki in a memory of the peripheral device. The peripheral device may then encrypt the encryption key Ki according to the security controller public key $SC_{pk}$ to form (Ki) $SC_{pk}$. The security controller then decrypts the peripheral device encryption key Ki with its private key of the public key $SC_{pk}$. The security controller may then generate a first Message Authentication Code (MAC) key ($Km_1$), and a first security controller encryption key ($Ke_1$). The security controller then encrypts the MAC key according to encryption key $Ke_1$ to form ($Km_1$)$Ke_1$. The security controller stores the encryption key $Ke_1$ and and MAC key $Km_1$ in a memory. The security controller then transmits ($Km_1$)$Ke_1$ to the peripheral device which then stores ($Km_1$)$Ke_1$ as a pre-staged MAC key that can be utilized upon receipt of the encryption key $Ke_1$. Details of how the peripheral device comes into possession of the encryption key $Ke_1$ and utilize the pre-staged MAC key are illustrated and described with regard to FIG. 3.

FIG. 3 is a data flow and processing chart, according to an example embodiment. The data flow and processing chart of FIG. 3 illustrates data communications and data processing activities that are performed by and between a security controller an SST, a PC core that controls operation of the SST, and a peripheral device of the SST. The data communications and data processing are premised on a MAC key having been pre-staged on the peripheral device, such as is illustrated and described with regard to FIG. 2.

The data flow and processing of FIG. 3 begins with a PC core sending a message with host authorization to the security controller that is intended for delivery to the peripheral device. The host authorization is an authorization that may have originated on another computing device, such as a banking system 116 of FIG. 1. The host authorization is generally a command and authorization to perform an action on a peripheral device. This may include a cash dispense command when the peripheral device is a cash dispenser.

The security controller upon receipt of the message with the host authorization performs a number of actions. These actions include verifying the host authorization and obtaining a MAC key that is pre-staged on the peripheral device. Obtaining the MAC key includes retrieving the stored $Km_1$ and then calculating the MAC based thereon to obtain a MAC. The MAC is an encrypted form of the host authorization message. The security controller further generates and stores a second MAC key $Km_2$ that will be pre-staged to the peripheral device once the first pre-staged MAC key has been utilized. The security controller also generates and stores a new encryption key $Ke_2$ and then encrypts the new MAC key $Km_2$ with the new encryption key $Ke_2$ to form ($Km_2$)$Ke_2$. The security controller then encrypts the first encryption key $Ke_1$ with the encryption key Ki of the peripheral device to form ($Ke_1$)Ki. Once this data has been processed and the various keys and MAC created, the security controller than generates and sends a message to the PC core that includes the MAC pre-staged to the peripheral device, ($Ke_1$)Ki, and ($Km_2$)$Ke_2$.

The PC core upon receipt of the message from the security controller then generates and sends a message to the peripheral device that includes a message with an authorized command to be executed on the peripheral device, the MAC, ($Ke_1$)Ki, and ($Km_2$)$Ke_2$.

The peripheral device receives the message from the PC core and then performs several data processing actions thereon. First, the peripheral device has a copy of the pre-staged MAC key stored in a memory, but in an encrypted form encrypted according to $Ke_1$ as well its own encryption key Ki. Thus, the first action performed on the received message is to decrypt ($Ke_1$)Ki with Ki to obtain $Ke_1$ in the clear. $Ke_1$ may then be stored and is then used to decrypt ($Km_1$)$Ke_1$ to obtain the pre-staged MAC key in the clear. The peripheral device uses the pre-staged MAC key in the clear to create the MAC which is then compared with the MAC included in the message received from the PC core. When there is a match, the peripheral device then executes one or more commands included in the received message.

The peripheral device then replaces the stored pre-staged MAC key in memory with the new pre-staged MAC key $(Km_2)Ke_2$.

Figure 4:
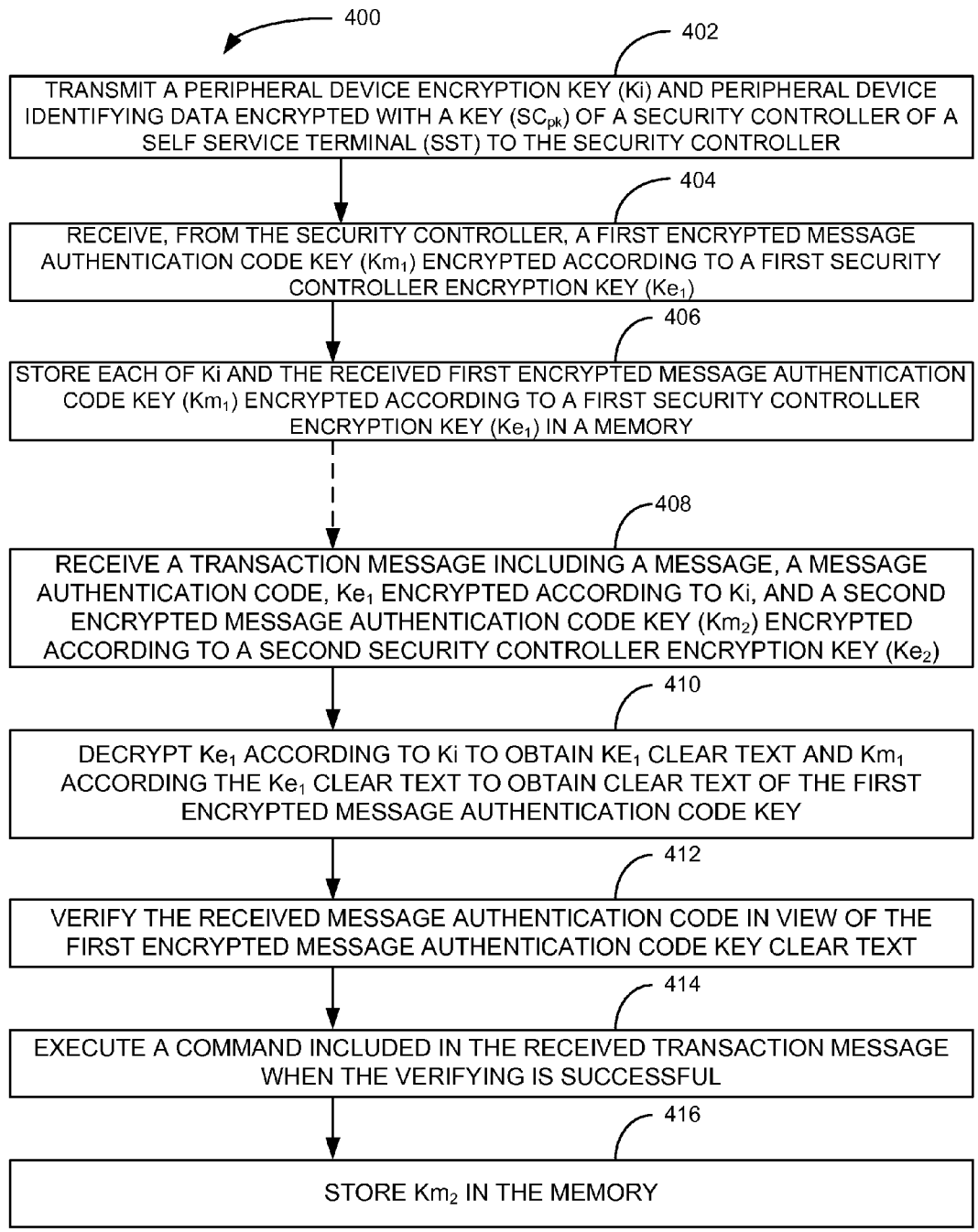
FIG. 4 is a block flow diagram of a method, according to an example embodiment.

FIG. 4 is a block flow diagram of a method 400, according to an example embodiment. The method 400 is an example of a method performed by a peripheral device, according to some embodiments. The method 400 includes transmitting 402 a peripheral device encryption key (Ki) and peripheral device identifying data encrypted with a key $(SC_{pk})$ of a security controller of a Self Service Terminal (SST) to the security controller. The peripheral device identifying data may include a serial number and data identifying a type of the peripheral device performing the method 400. The method 400 further includes receiving 404, from the security controller, a first encrypted message authentication code $(Km_1)$ encrypted according to a first security controller encryption key $(Ke_1)$. The method 400 may then store 406 each of Ki and the received first encrypted MAC key $(Km_1)$ encrypted according to a first security controller encryption key $(Ke_1)$ in a memory.

Subsequently, the method 400 may include receiving 408 a transaction message including a message, a message authentication code, $Ke_1$ encrypted according to Ki, and a second encrypted MAC key $(Km_2)$ encrypted according to a second security controller encryption key $(Ke_2)$. The method 400 may then decrypt 410 $Ke_1$ according to Ki to obtain $Ke_1$ clear text and $Km_1$ according the $Ke_1$ clear text to obtain clear text of the first encrypted MAC key. Next, the method 400 verifies 412 the received message authentication code in view of the first encrypted message authentication code clear text and executes 414 a command included in the received transaction message when the verifying is successful. The method 400 then stores 416 $Km_2$ in the memory.

Figure 5:
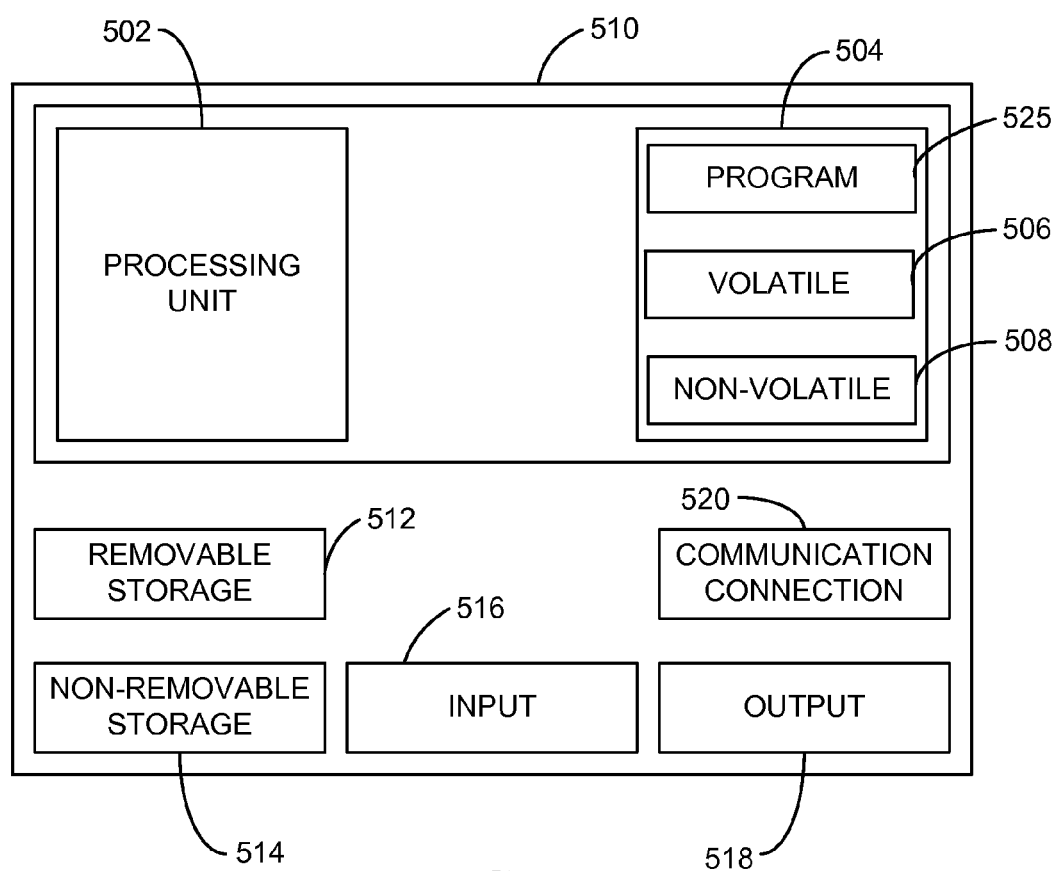
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, ROM, and RAM are some examples of articles including a non-transitory computer-readable medium. For example, a computer program 525 capable of executing to perform one or more, or a portion, of one or more of the methods illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
transmitting a peripheral device encryption key (Ki) and peripheral device identifying data encrypted with a key $(SC_{pk})$ of a security controller of a Self Service Terminal (SST) to the security controller by a peripheral device of a host computer of the SST in advance of receipt by the security controller of a host message from a host computer to perform an action on the peripheral device;
receiving, from the security controller, a first encrypted message authentication code key $(Km_1)$ encrypted according to a first security controller encryption key $(Ke_1)$ by the peripheral; and
storing, by the peripheral device, each of Ki and the received first encrypted message authentication code key $(Km_1)$ encrypted according to a first security controller encryption key $(Ke_1)$ in a memory of the peripheral device.

2. The method of claim 1, further comprising:
receiving a transaction message including a message, a message authentication code, $Ke_1$ encrypted according to Ki, and a second encrypted message authentication code key $(Km_2)$ encrypted according to a second security controller encryption key $(Ke_2)$;
decrypting $Ke_1$ according to Ki to obtain $Ke_1$ clear text and $Km_1$ according the $Ke_1$ clear text to obtain clear text of the first encrypted message authentication code key;
verifying the received message authentication code in view of the first encrypted message authentication code key clear text;
executing a command included in the received transaction message when the verifying is successful; and
storing $Km_2$ in the memory.

3. The method of claim 2, wherein the transaction message is received from the host computer of the SST.

4. The method of claim 1, wherein the peripheral device identifying data includes a serial number and data identifying a type of the peripheral device that performs the method.

5. The method of claim 1, wherein the security controller is an encrypting Personal Identification Number (PIN) pad device.

6. The method of claim 1, wherein the peripheral device that performs the method is a cash dispenser.

7. The method of claim 1, wherein the SST is an Automated Teller Machine (ATM).

8. A method performed by a peripheral device of a Self-Service Terminal (SST), the method comprising:
transmitting peripheral device identifying data to an SST security controller by a peripheral device of a host computer of the SST in advance of receipt by the security controller of a host message from a host computer to perform an action on the peripheral device;
receiving a public key ($SC_{pk}$) from the security controller by the peripheral device;
generating a peripheral device encryption key (Ki) by the peripheral device;
encrypting Ki according to $SC_{pk}$ by the peripheral device;
transmitting the encrypted Ki to the security controller by the peripheral device;
receiving, from the security controller, a first encrypted message authentication code key ($K_{m1}$) encrypted according to a first security controller encryption key ($Ke_1$) by, the peripheral device; and
storing, by the peripheral device, each of Ki and the received $K_{m1}$ in a memory of the peripheral device.

9. The method of claim 8, further comprising:
receiving a transaction message including a message, a message authentication code, $K_{e1}$ encrypted according to Ki, and a second encrypted message authentication code key ($K_{m2}$) encrypted according to a second security controller encryption key ($Ke_2$);
decrypting $Ke_1$ according to Ki to obtain $Ke_1$ clear text;
decrypting $Km_1$ according the $Ke_1$ clear text to obtain clear text of the first encrypted message authentication code key;
verifying the received message authentication code in view of the first encrypted message authentication code key clear text; and
storing $Km_2$ in the memory.

10. The method of claim 9, wherein the transaction message is received from the host computer of the SST.

11. The method of claim 8, wherein the peripheral device identifying data includes a serial number and data identifying a type of the peripheral device that performs the method.

12. The method of claim 8, wherein the security controller is an encrypting Personal Identification Number (PIN) pad device.

13. The method of claim 8, wherein the peripheral device that performs the method is a cash dispenser.

14. The method of claim 8, wherein the SST is an Automated Teller Machine (ATM).

15. A Self-Service Terminal (SST) comprising:
a processor;
a peripheral device coupled to the processor;
a security controller device including a memory device and coupled to the processor and to the peripheral device, the security controller device operable to perform data processing activities between the processor and the peripheral device in advance of receipt by the security controller device of a host message from the processor to perform an action on the peripheral device comprising:
receiving peripheral device identifying data from the peripheral device;
transmitting a public key ($SC_{pk}$) of the security controller device to the peripheral device;
decrypting a received peripheral device encryption key (Ki) according to $SC_{pk}$;
generating a first security controller encryption key ($Ke_1$);
generating a first message authentication code key and encrypting the first message authentication code key according to $Ke_1$ to obtain $(Km_1)Ke_1$;
transmitting $(Km_1)Ke_1$ to the peripheral device; and
storing Ki and $(Km_1)Ke_1$ in the memory device.

16. The SST of claim 15, further comprising:
receiving a message addressed to the peripheral device;
generating a second security controller device encryption key ($Ke_2$);
generating a second message authentication code key and encrypting the second message authentication code key according to $Ke_2$ to obtain $(Km_2)Ke_2$;
storing $(Km_2)Ke_2$ in the memory device;
transmitting the received message, the first message authentication code, $Ke_1$ encrypted according to Ki, and $(Km_2)Ke_2$ to the peripheral device.

17. The SST of claim 15, wherein the peripheral device identifying data includes a serial number and data identifying a type of the peripheral device.

18. The SST of claim 15, wherein the security controller is an encrypting Personal Identification Number (PIN) pad device.

19. The SST of claim 15, wherein the peripheral device is a cash dispenser.

20. The SST of claim 15, wherein the SST is an Automated Teller Machine (ATM).

21. A method comprising:
transmitting a peripheral device encryption key (Ki) and peripheral device identifying data encrypted with a key ($SC_{pk}$) of a security controller of a Self Service Terminal (SST) to the security controller;
receiving, from the security controller, a first encrypted message authentication code key ($Km_1$) encrypted according to a first security controller encryption key ($Ke_1$);
storing each of Ki and the received first encrypted message authentication code key ($Km_1$) encrypted according to a first security controller encryption key ($Ke_1$) in a memory;
receiving a transaction message including a message, a message authentication code, $Ke_1$ encrypted according to Ki, and a second encrypted message authentication code key ($Km_2$) encrypted according to a second security controller encryption key ($Ke_2$);
decrypting $Ke_1$ according to Ki to obtain $Ke_1$ clear text and $Km_1$ according the $Ke_1$ clear text to obtain clear text of the first encrypted message authentication code key;
verifying the received message authentication code in view of the first encrypted message authentication code key clear text;
executing a command included in the received transaction message when the verifying is successful; and
storing $Km_2$ in the memory.

22. A method performed by a peripheral device of a Self-Service Terminal (SST), the method comprising:
transmitting peripheral device identifying data to an SST security controller;
receiving a public key ($SC_{pk}$) from the security controller;
generating a peripheral device encryption key (Ki);
encrypting Ki according to $SC_{pk}$;
transmitting the encrypted Ki to the security controller;
receiving, from the security controller, a first encrypted message authentication code key ($Km_1$) encrypted according to a first security controller encryption key ($Ke_1$);
storing each of Ki and the received $Km_1$ in a memory;

receiving a transaction message including a message, a message authentication code, $Ke_1$ encrypted according to Ki, and a second encrypted message authentication code key ($Km_2$) encrypted according to a second security controller encryption key ($Ke_2$);

decrypting $Ke_1$ according to Ki to obtain $Ke_1$ clear text;

decrypting $Km_1$ according the $Ke_1$ clear text to obtain clear text of the first encrypted message authentication code key;

verifying the received message authentication code in view of the first encrypted message authentication code key clear text; and storing $Km_2$ in the memory.

23. A Self-Service Terminal (SST) comprising:

a peripheral device;

a security controller device including a memory device and a coupling to the peripheral device, the security controller device operable to perform data processing activities comprising:

receiving peripheral device identifying data from the peripheral device; transmitting a public key ($SC_{pk}$) of the security controller device to the peripheral device;

decrypting a received peripheral device encryption key (Ki) according to $SC_{pk}$;

generating a first security controller encryption key ($Ke_1$);

generating a first message authentication code key and encrypting the first message authentication code key according to $Ke_1$ to obtain $(Km_1)Ke_1$;

transmitting $(Km_1)Ke_1$ to the peripheral device;

storing Ki and $(Km_1)Ke_1$ in the memory device;

receiving a message addressed to the peripheral device;

generating a second security controller device encryption key ($Ke_2$);

generating a second message authentication code key and encrypting the second message authentication code key according to $Ke_2$ to obtain $(Km_2)Ke_2$;

storing $(Km_2)Ke_2$ in the memory device; and transmitting the received message, the first message authentication code, $Ke_1$ encrypted according to Ki, and $(Km_2)Ke_2$ to the peripheral device.

\* \* \* \* \*